(12) United States Patent
Cho et al.

(10) Patent No.: US 8,044,785 B2
(45) Date of Patent: Oct. 25, 2011

(54) OIL QUANTITY MONITORING SYSTEM FOR MOTORCYCLE

(75) Inventors: Masaki Cho, Saitama (JP); Masahiko Nakatsuka, Saitama (JP); Yasutaka Usukura, Saitama (JP); Kazuhiro Takeuchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 347 days.

(21) Appl. No.: 12/390,736

(22) Filed: Feb. 23, 2009

(65) Prior Publication Data

US 2009/0212932 A1    Aug. 27, 2009

(30) Foreign Application Priority Data

Feb. 26, 2008   (JP) ................................ 2008-044010

(51) Int. Cl.
*B60Q 1/00*   (2006.01)
(52) U.S. Cl. ............ 340/450; 340/451; 340/453; 701/67
(58) Field of Classification Search .................. 340/450, 340/450.1, 450.15, 450.3, 438, 425.5, 451–453; 701/67, 2, 36
See application file for complete search history.

(56) References Cited

U.S. PATENT DOCUMENTS 5,748,077 A * 5/1998 Brandt .......................... 340/450
7,584,026 B2 * 9/2009 Siemer et al. ...................... 701/2

FOREIGN PATENT DOCUMENTS

JP          10-238327 A       9/1998

* cited by examiner

*Primary Examiner* — Anh V La
(74) *Attorney, Agent, or Firm* — Birch, Stewart, Kolasch & Birch, LLP

(57) ABSTRACT

The degradation of a feeling of ride is prevented by preventing engagement/disengagement (sudden engagement/disengagement) of a motorcycle hydraulic clutch due to a lack of hydraulic pressure. Before a hydraulic sensor issues a hydraulic pressure-lowering detection signal Sx, an oil level sensor issues an oil level-lowering warning signal Sf in a state wherein a sufficient oil quantity is such so as not to bring an neutral drive switching clutch into a disengagement state is present even if hydraulic pressure lowers resulting from an inclined oil level due to sudden deceleration, sudden start, drive in a slope, or the like. Thus, the neutral drive switching clutch can be prevented from disengaging or engaging (suddenly disengaging or engaging).

18 Claims, 4 Drawing Sheets

OIL QUANTITY MONITORING SYSTEM FOR MOTORCYCLE

CROSS-REFERENCE TO RELATED APPLICATIONS

The present application claims priority under 35 USC 119 to Japanese Patent Application No. 2008-044010 filed on Feb. 26, 2008 the entire contents of which are hereby incorporated by reference.

BACKGROUND OF THE INVENTION

1. Field of the Invention

The present invention relates to an oil quantity monitoring system for a motorcycle provided with a hydraulic clutch brought by hydraulic pressure into a neutral state where power of an engine is interrupted from a drive wheel side and into a drive state where the power of the engine is applied to the drive wheel side.

2. Description of Background Art

A hydraulic switch for detecting whether or not hydraulic pressure is equal to or greater than a prescribed value for a motorcycle is used to determine whether or not a proper quantity of lubricating oil (hereinafter also called oil) is present. See, for example, Japanese Patent Laid-open No. Hei 10-238327 (FIG. 5, paragraph [0018]).

Motorcycles are marketed that are mounted with a hydraulic clutch thereon which is switched by hydraulic pressure between a neutral state and a drive state by use of oil.

In a motorcycle mounted with a hydraulic clutch thereon, oil is shared by a lubricating system disposed around an engine including a crankshaft, a cam shaft, a transmission main shaft. In addition, the oil is used for the engagement/disengagement control of the hydraulic clutch.

However, motorcycles whose various portions share oil as described above have a problem as set forth below. If an oil quantity is lowers to or is below a lower limit of a prescribed value, hydraulic pressure may be momentarily lowered due to the inclination of an oil level resulting from sudden deceleration, sudden starting, driving on a sloping road or the like. In such a case, the hydraulic clutch comes into a disengagement state to degrade a feeling of the ride.

SUMMARY AND OBJECTS OF THE INVENTION

It is an object of an embodiment of the present invention to provide an oil quantity monitoring system for a motorcycle that can prevent the degradation of a feeling of the ride.

An oil quantity monitoring system for a motorcycle according to an embodiment of the present invention includes a hydraulic clutch disengaged/engaged that is brought by hydraulic pressure into a neutral state where the power of an engine is interrupted from a drive wheel side and into a drive state where the power of the engine is applied to the drive wheel side. An oil level sensor is provided for detecting an oil level of an oil tank for storing operating oil of the hydraulic clutch and issuing an oil level-lowering warning signal when the oil level lowers to a prescribed oil level and a hydraulic sensor for detecting hydraulic pressure of the operating oil of the hydraulic clutch adapted to receive the operating oil supplied thereto from the oil tank via a hydraulic circuit. The system is set so that when the oil level of the oil tank lowers, the oil level sensor issues the oil level-lowering warning signal before the hydraulic sensor issues the hydraulic pressure-lowering detection signal.

According to an embodiment of the present invention, before the hydraulic sensor issues the hydraulic pressure-lowering detection signal, the oil level sensor issues the oil level-lowering warning signal in a state where a sufficient oil quantity is such so as not to bring the hydraulic clutch into the disengagement state is present. Thus, the hydraulic clutch can be prevented from disengaging/engaging (suddenly disengaging/engaging).

The quantity of residual oil existing in the oil tank encountered when the oil level sensor issues the oil level-lowering warning signal is preferably set to such an oil quantity so as to enable 1000 Km or more travel as a result of previous calculation from the oil consumption in a normal traveling state. In addition, the oil level sensor is preferably set to issue the oil level-lowering detection signal when the quantity of oil in the oil tank is below the oil quantity needed for enabling 1,000 Km of travel.

An alarm (e.g., an indicator in a meter) adapted to receive an oil-lowering detection signal may be provided and upon receipt of the oil-lowering warning signal, may be used to inform (indicate) that the hydraulic clutch may probably be disengaged.

In addition, an operating oil supply prohibiting device is provided which prohibits the supply of operating oil to the hydraulic clutch upon receipt of the hydraulic pressure-lowering detection signal generated when the oil quantity becomes significantly smaller than when the oil level-lowering warning signal is generated. Thus, traveling is prohibited in the state where the necessary quantity of oil is lacking including the quantity of oil necessary for the lubricating system excluding the hydraulic clutch. In this case, the wear of devices or the like can be prevented by forcing the user such as an operator or the like to check the oil quantity and do replenishment.

According to an embodiment of the present invention, the oil level sensor issues the oil level-lowering warning signal in the state where a sufficient oil quantity is such so as not to bring the hydraulic clutch into the disengagement state (however, in the state where the oil quantity is smaller than the appropriate range quantity) is present even if the hydraulic pressure lowers resulting from the inclination of the oil level due to sudden deceleration, sudden start, drive in a slope, or the like. Thus, the hydraulic clutch of the motorcycle can be prevented from disengaging or engaging (sudden disengaging or engaging). This can prevent the degradation of a feeling of ride.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment of the present invention will hereinafter be described with reference to the drawings.

Figure 1:
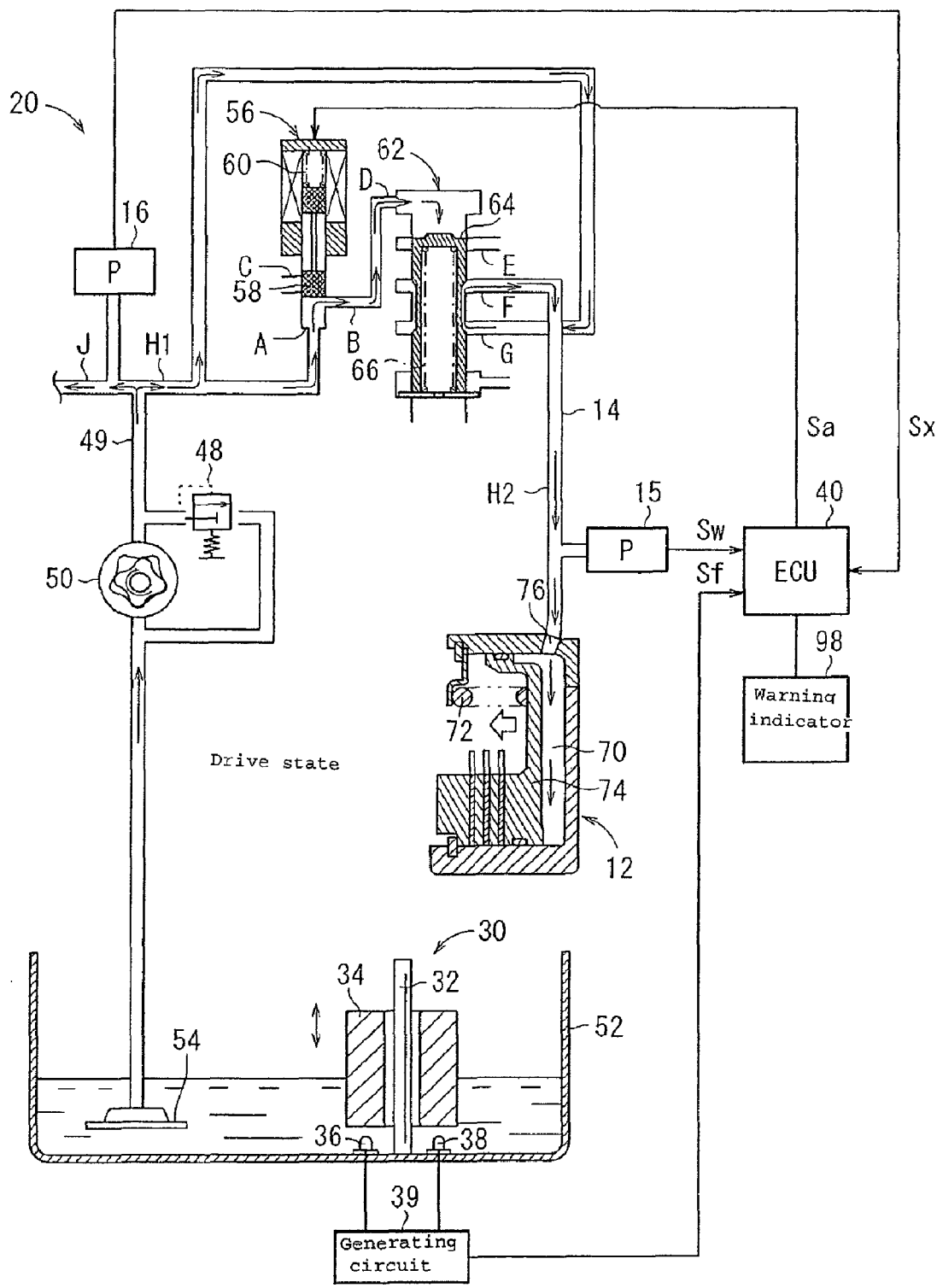
FIG. 1 is a schematic diagram illustrating a hydraulic clutch mechanism of a motorcycle mounted with an oil quantity monitoring system thereon according to an embodiment of the present invention.

FIG. 1 is a schematic diagram illustrating a hydraulic clutch mechanism 20 of a motorcycle mounted with an oil quantity monitoring system 10 according to the embodiment of the present invention.

FIG. 1 illustrates an engagement state, a drive state, of a hydraulic clutch, a neutral drive switching clutch (called the ND switching clutch). Hereinafter, neutral-drive is abbreviated as "ND."

Figure 2:
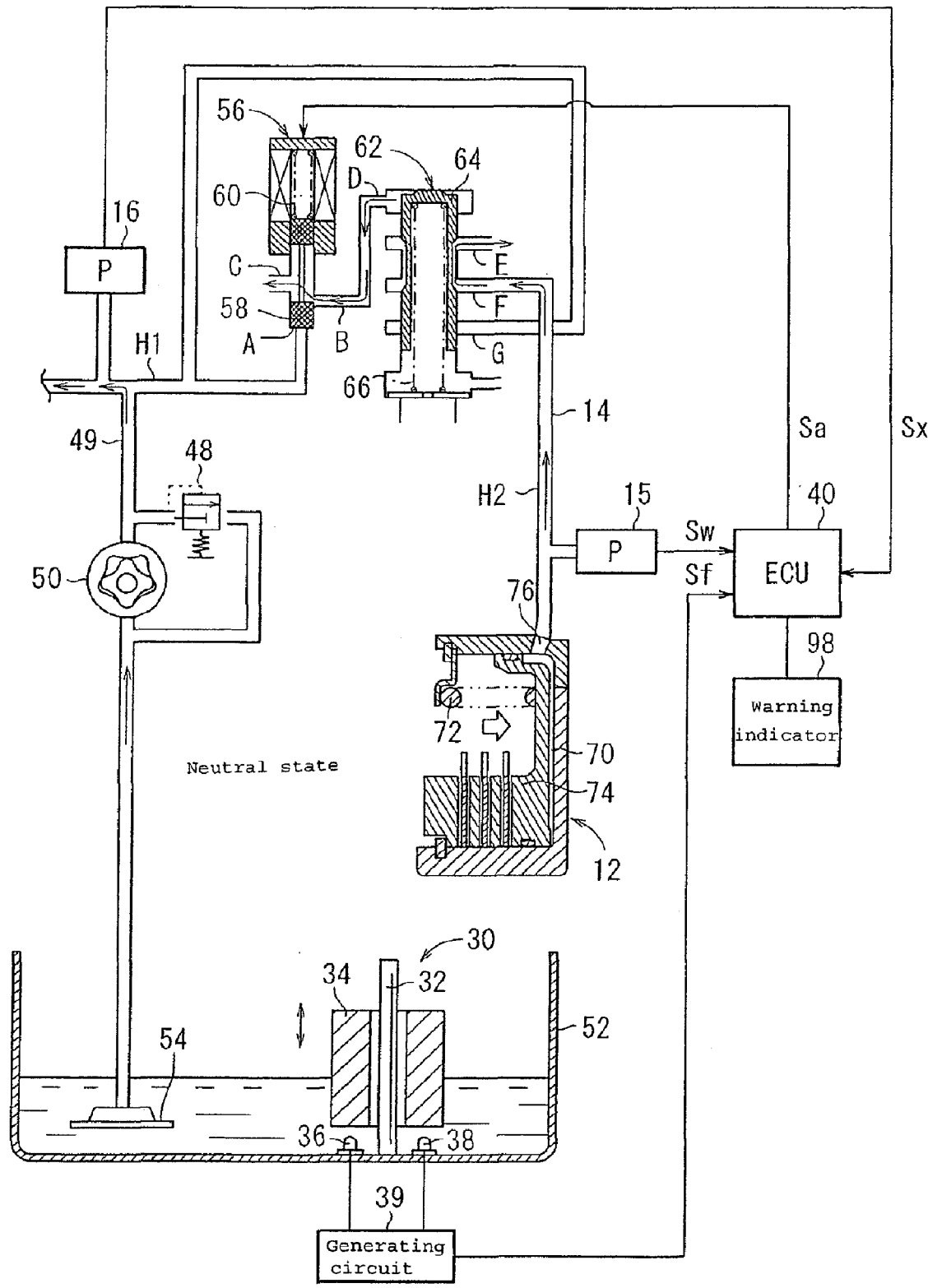
FIG. 2 is a diagram for assistance in explaining a transition state from an engagement state (a drive state) of a neutral drive switching clutch to a disengagement state (a neutral state)

FIG. 2 illustrates a disengagement (disconnection) state, a neutral state, of the ND switching clutch 12.

An oil level sensor 30 is mounted in an oil pan 52 (an oil tank) in which oil also serving as operating oil of the ND switching clutch 12. The oil level sensor 30 includes a stem (central shaft) 32, a float 34, terminals 36, 38 which are projections, and an oil level-lowering warning-signal generating circuit 39 adapted to receive an output from the terminals 36, 38.

When the oil in the oil pan 52 is reduced to lower to a prescribed oil level described later, the oil level sensor 30 is such that the bottom surface of the float 34 lowering along the stem 32 comes into contact with the terminals 36, 38 for short-circuiting. During the short-circuiting, the oil level-lowering warning-signal generating circuit 39 outputs an oil level-lowering warning signal Sf being a value 1 (a high-level).

In the drive state of the ND switching clutch 12 shown in FIG. 1 and in the neutral state of the ND switching clutch 12 shown in FIG. 2, the oil stored in the oil pan 52 (the oil tank) is pumped via an oil strainer 54 by a high-pressure oil pump 50 rotated in response to the rotation of a crankshaft not shown.

An oil passage with a relief valve 48 is provided parallel to a high-pressure oil pump 50. The relief valve 48 is set so that the pressure of oil discharged from a high-pressure oil discharge port 49 will not reach a given pressure or more.

The oil discharged from the high-pressure discharge port 49 bifurcates into an oil passage H1 on the side of the ND switching clutch 12 and an oil passage J toward the lubricating system of the engine and toward a hydraulic control equipment system.

Oil from the oil passage J is supplied to the lubricating system of the engine, such as a transmission main shaft, a counter shaft, a camshaft, a crankshaft, etc. The oil supplied to the lubricating system returns to the oil pan 52. On the other hand, oil is supplied from the oil passage H1 to the hydraulic clutch mechanism 20.

A hydraulic sensor 16 for measuring hydraulic pressure is provided near the oil passage j and the oil passage H1. The hydraulic sensor 16 is provided with a diaphragm type pressure detecting section. The hydraulic sensor 16 functions as a sensor for detecting the hydraulic pressure of operating oil of the ND switching clutch 12 to issue a hydraulic pressure lowering detection signal Sx with the value 1 (the high-level) when the hydraulic pressure of the oil passage H1 lowers to a prescribed hydraulic pressure.

Now, a description is first given of a transition from the engagement state (the drive state) of the ND switching clutch 12 to the disengagement state (the neutral state) with reference to FIG. 2.

Application of current to the solenoid of a neutral-drive switching solenoid (called the ND switching solenoid) is interrupted by a vehicle operator operating a change from drive to neutral. This causes electromagnetic force drawing a valve body 58 to disappear. Thus, the valve body 58 is pressed by a coil spring 60 to close a port A and open ports B and C.

Consequently, the oil on a top portion of an ND switching spool valve 62 flows into a crankcase via a port D of the ND switching spool valve 62 and via ports B, C of the ND switching solenoid 56, returning to the oil pan 52.

In this way, since the pressurization in the top portion of the ND switching spool valve 62 disappears, the valve body 64 is pressed and moved by the coil spring 66 to close a port G and open ports E, F.

Then, the oil in a hydraulic chamber 70 of the ND switching clutch 12 is pressed by a piston 74 biased by the return spring 72 to reversely flow through an oil port 76 and in an oil passage H2, further through the ports F, E of the ND switching spool valve 62, flowing in the crankcase, and return to the oil pan 52.

In this way, the ND switching clutch 12 is disengaged due to a separation between a main shaft side clutch disk 82 connected to a drive wheel not shown and a friction disk 84 connected to a crankshaft side, coming into a neutral state where the power of the engine is interrupted from the drive wheel side.

In this case, the pressure of the hydraulic chamber 70, i.e., the oil of the oil passage H2, is in a low-pressure state. Thus, a neutral state detection switch 15 provided at oil passage H2 issues a neutral state detection signal Sw of the value 1 (the high level) to notify an ECU 40 of the neutral state.

The above description discloses the transition from the drive state of the ND switching clutch 12 to the neutral state.

A description is next given of the transition from a disengagement state (a neutral state) of the ND switching clutch 12 to the engagement state (the drive state) with reference to FIG. 1.

Electricity is applied to the solenoid of the ND switching solenoid 56 by the vehicle operator operating the change from neutral to drive.

In FIG. 1, oil is pumped by the high-pressure pump 50 from the oil pan 52 through the oil strainer 54. The oil discharged from the high-pressure oil discharge port 49 is discharged at a given pressure through the operation of the relief valve 48 if the quantity of oil in the oil pan 52 is sufficient.

The oil discharged from the high-pressure oil discharge port 49 is supplied from the oil passage J to the lubricating system of the engine and to the hydraulic control equipment system, as well as from the oil passage H1 to the hydraulic clutch mechanism 20.

When the ND switching clutch 12 is operated to come into the drive state, the ND switching solenoid 56 is energized. Thus, the valve body 58 is drawn by the solenoid against the biasing force of the coil spring 60 to open the ports A, B.

In this case, the oil enters the top portion of the valve body 64 of the ND switching spool valve 62 from the ports A, B via the port D of the ND switching spool valve 62 to depress the valve body 64 against the biasing force of the coil spring 66, thereby opening the ports F, G.

The oil directly delivered to the ND switching spool valve 62 enters the port G via a small-diameter portion of the valve body 64 and gets out of the port F. Then the oil passes through the oil passage H2 and the oil port 76 and enters the hydraulic chamber 70 of the ND switching clutch 12 to increase the pressure therein, which presses the piston 74 against the biasing force of the return spring 72. Thus, the clutch disk 82 and friction disk 84 of the ND switching clutch 12 are connected with each other, providing the drive state.

In this case, the pressure of the hydraulic chamber 70, i.e., oil in the oil passage H2, is in the high-pressure state. Thus, the neutral state detection switch 15 does not issue the neutral state detection signal Sw (the value of the neutral sate detection signal Sw is zero (the low level)). In addition, also the hydraulic pressure of the oil passage H1 communicating with the hydraulic chamber 70 is higher than the prescribed value. Thus, the hydraulic sensor 16 does not issue a hydraulic pressure-lowering detection signal Sx (the value of the hydraulic pressure-lowering detection signal Sx is zero (the low level)).

The above description discloses the transition from the neutral state to drive state of the ND switching clutch 12.

Referring to FIGS. 1 and 2, the ECU (the electronic control unit) 40 is adapted to receive the neutral state detection signal Sw from the neutral state detection switch 15, the hydraulic pressure-lowering detection signal Sx from the hydraulic sensor 16 and the oil level-lowering warning signal Sf from the oil level-lowering warning signal generating circuit 39. The ECU 40 functions as an oil quantity monitoring device.

The ECU 40 is connected to a warning indicator 98 and sends an oil supply prohibition signal Sa to the ND switching solenoid 56 which also functions as an operating oil supply prohibiting device.

A CPU, not shown, of the ECU 40 runs a program stored in a memory such as a ROM or the like on the basis of various inputs to implement various functions.

A description is next given of the operation of the ECU 40 functioning as the oil monitoring device.

Figure 3:
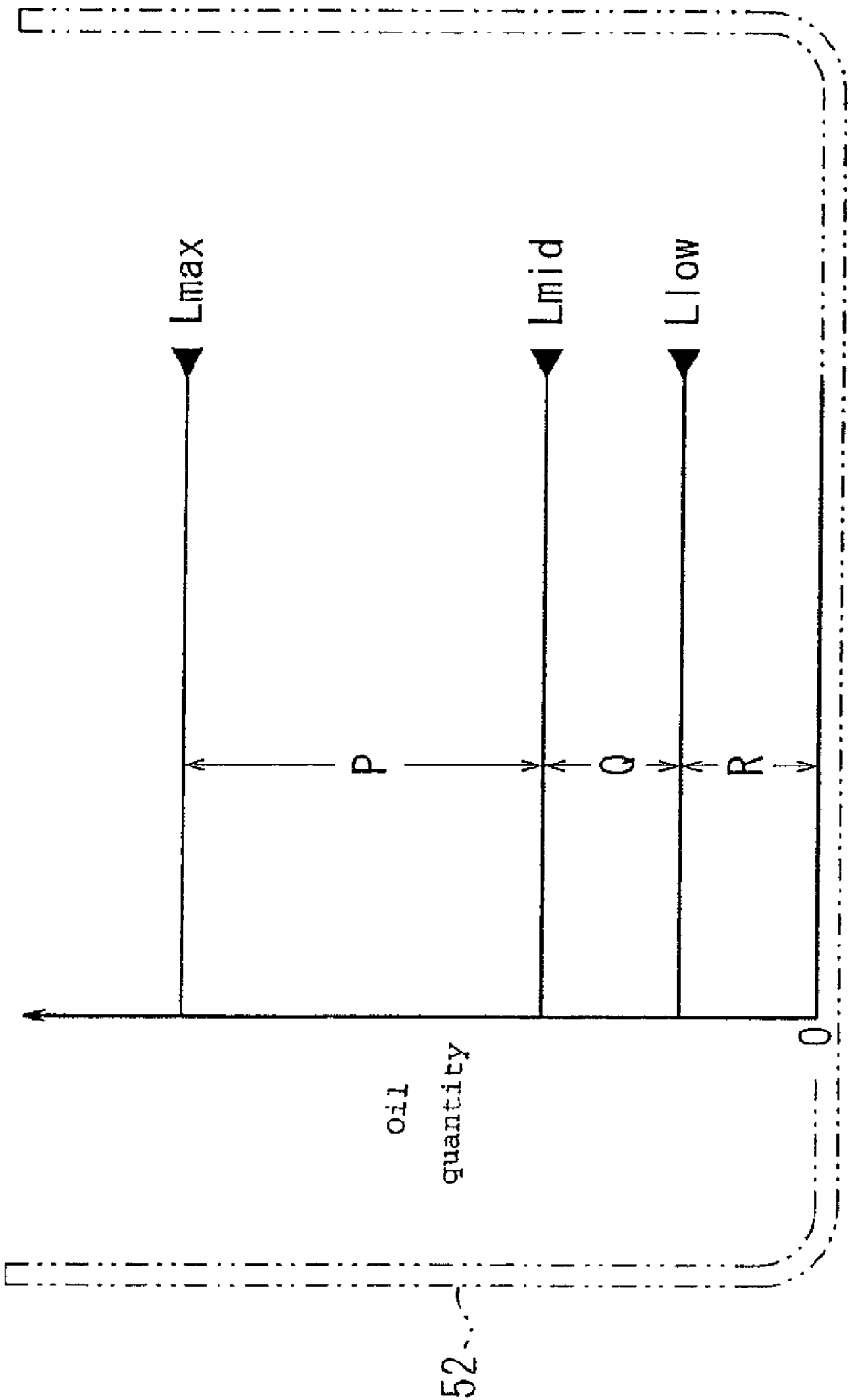
FIG. 3 is a diagram for assistance in explaining an oil lever monitoring range table stored in a memory in an ECU.

FIG. 3 is a diagram for assistance in explaining an oil quantity monitoring table 80 indicating the quantity of oil in the oil pan 52 and a monitoring range thereof and stored in the memory of the ECU 40.

An oil quantity that falls in an oil quantity range from a maximum oil level quantity Lmax to an oil level-lowering warning quantity Lmid is defined as an operating oil appropriate range quantity P.

An oil quantity that falls in an oil quantity range from the oil level-lowering warning quantity Lmid being an oil quantity at which the oil level-lowering warning signal Sf to a hydraulic pressure-lowering detection quantity Llow being an oil quantity at which the hydraulic pressure-lowering detection signal Sx is issued is defined as an operating oil warning range quantity Q.

An oil quantity that falls in an oil quantity range from the hydraulic pressure-lowering detection quantity Llow to a zero value is defined as an operating oil supply prohibition range quantity R.

In addition, the measurement of the oil quantity by the oil level sensor 30 is executed under given conditions such as after four minutes or later after engine stoppage, at the time of starting, or the like.

The hydraulic sensor 16 detects the lowering of hydraulic pressure even in the neutral state of the ND switching clutch 12. Thus, upon detection of the hydraulic pressure-lowering detection signal Sx of the value 1, the ECU 40 determines that oil quantity falls in the range of the operating oil supply prohibition range amount R on the condition of the drive state set by the change. In actuality, when the quantity of oil in the oil pan 52 reduces to the operating oil supply prohibition range amount R, the hydraulic pressure of oil discharged from the high-pressure oil discharge port 49 on the output side of the oil pump 50 lowers. Thus, the force pressurizing the top portion of the ND switching spool valve 62 becomes small. When the force pressurizing the top portion of the ND switching spool valve 62 becomes small, the valve body 64 is pressed by the coil spring 66, and e.g., momentarily moved to close the port G and open the ports E, F, which momentarily lowers the hydraulic pressure in the oil passage H2. Then, the hydraulic pressure in the hydraulic chamber 70 of the ND switching clutch 12 communicating with the oil passage H2 momentarily drops to momentarily disengage the ND switching clutch 12. The hydraulic pressure is further reduced to continuously produce the momentary disengagement.

In the embodiment, the quantity of residual oil existing in the oil pan 52 encountered when the ECU 40 receives the oil level-lowering warning signal Sf being the value 1 resulting from the short-circuiting between the terminals 36, 38 by the float 34 is set forth below. (The residual oil quantity corresponds to an oil quantity at the upper limit position of the operating oil warning range quantity Q, that is, to the oil level-lowering warning quantity Lmid.) The residual oil quantity is set to such an oil quantity as to enable 1,000 Km or more travel as a result of a previous calculation from the oil consumption in a normal traveling state. In other words, the oil level sensor 30 is set to issue the oil level-lowering warning signal Sf of the value 1 when the quantity of oil in the oil pan 52 is below the oil level-lowering warning quantity Lmid being oil quantity enabling the 1,000 Km travel.

Upon receipt of the oil level-lowering warning signal Sf, the ECU 40 allows a warning indicator 98 installed in a meter to indicate a small oil quantity (e.g., green lighting encountered when the oil level falls in the operating oil appropriate range quantity P is changed to yellow lighting encountered when the oil level falls in the operating oil warning range quantity Q). This indication prompts a user such as a driver or the like to replace or add oil. In this case, the warning indicator 98 may simultaneously indicate that the ND switching clutch may probably disengage (momentarily come into the neutral state regardless of in the drive state).

Further, the oil quantity further lowers from the oil level-lowering warning quantity Lmid and then is below the hydraulic pressure-lowering detection quantity Llow. Thus, upon receipt of the hydraulic pressure-lowering detection signal Sx from the hydraulic sensor 16, the ECU 40 sends the oil supply prohibition signal Sa to the ND switching solenoid 56.

At this time, the ECU 40 changes the indication of the warning indicator 98 to a red lighting indicating the state of prohibiting the supply of operating oil to the ND switching clutch 12. In this way, travel is prohibited in the state where the necessary quantity of oil including the oil quantity necessary for the other lubricating system lacks. This forces the user to check the oil quantity or add oil to prevent wear of devices or the like.

Figure 4:
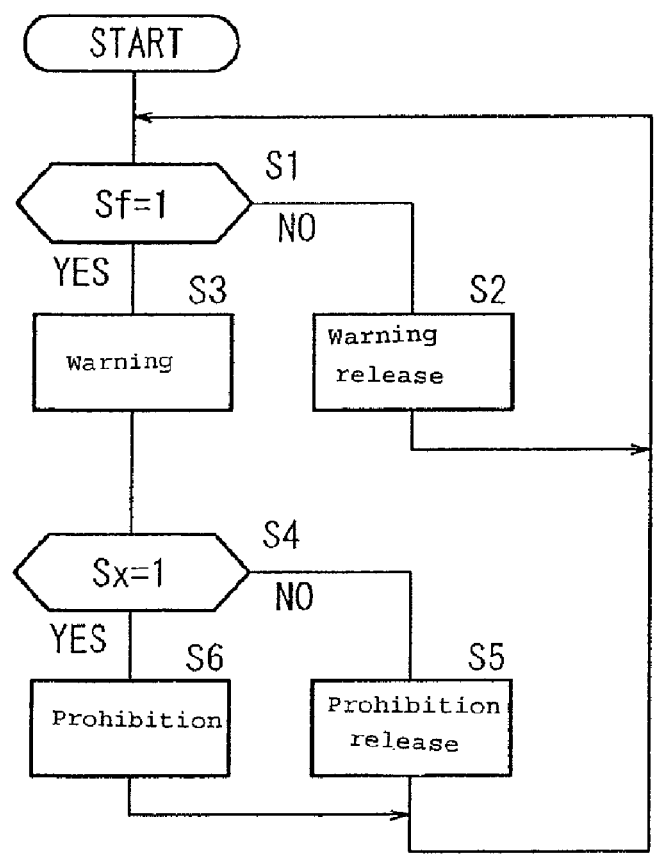
FIG. 4 is a flowchart for assistance in explaining an oil level monitoring function.

The detailed operation of the ECU 40 functioning as the oil level monitoring device is next described with reference to the oil quantity monitoring range table 80 and on the basis of the flowchart of FIG. 4.

In step S1, the ECU 40 first detects the state of the oil level-lowering detection signal Sf. If the oil level-lowering detection signal Sf is zero, the oil quantity falls in the range (Lmax to Lmid) of the operating oil appropriate range amount P. In step S2, the ECU 40 releases the warning of the warning indicator 98 and changes the indication of the warning indicator 98 to blue.

On the other hand, if the oil level lowers to lower the float 34, which short-circuits the terminals 36, 38, that is, if the oil level is below the oil level-lowering warning quantity Lmid, the oil level-lowering warning signal Sf detected in step S1 is 1. In step 3, the ECU 40 changes the indication of the warning indicator 98 to yellow. In this case, even if, in step 4, the ECU 40 detects the state of the hydraulic pressure-lowering detection signal Sx, Sx=0. In step S5, the ECU 40 executes processing of releasing the operating oil supply prohibition.

While the operation of the ECU 40 follows the loop, step S1: YES→S3→S4: No→S5→step S1, the oil quantity falls in the range of the operating oil warning range quantity Q; therefore, the indication of the warning indicator 98 is yellow.

When the oil level further lowers to lower the hydraulic pressure and the oil quantity is below the hydraulic pressure-lowering detection quantity Llow in step 4, the hydraulic sensor 16 issues the hydraulic pressure-lowering detection signal Sx (Sx=1). In this case, in step 6, the ECU 40 having detected the hydraulic pressure detecting signal Sx (Sx=1) sends the oil supply prohibition signal Sa being the value 1 to the ND switching solenoid 56. Then, energization of the solenoid of the ND switching solenoid 56 is interrupted so that an electromagnetic force drawing the valve body 58 disappears. Consequently, the valve body 58 is pressed by the coil spring 60 to close the port A and open the ports B, C. This allows the oil on the top portion of the ND switching spool valve 62 to flow into the crankcase through the port D of the ND switching spool valve 62 and the ports B, C of the ND switching solenoid 56 and retunes to the oil pan 52. In this way, the pressure applied to the top portion of the ND switching spool valve 62 disappears so that the valve body 64 is pressed and moved by the coil spring 66 to close the port G and open the ports E, F. Consequently, the oil in the hydraulic chamber 70 of the ND switching clutch 12 is pressed by the piston 74 biased by the return spring 72 to reversely flow in the oil passage H2 via the oil port 76, and via the ports F, E of the ND switching spool valve 62, and flows in the crankcase, returning to the oil pan 52. As a result, the clutch disk 82 and the friction disk 84 are away from each other so that the ND switching clutch 12 comes into disengagement, i.e., into the neutral state.

While the operation of the ECU 40 follows the loop, step S1: YES→S3→S4: YES→S6→step S1, the oil quantity falls in the range of the operating oil supply prohibition range quantity R; therefore, the indication of the warning indicator 98 is red.

When oil is replenished in the oil pan 52 by the user or the like so that the oil quantity exceeds the oil pressure-lowering detection quantity Llow, negative (NO) is established in step 4. Then in step 5, the operating oil supply prohibition is released. If the oil quantity further exceeds the oil level-lowering warning quantity Lmid, negative (NO) determination is made in step S1 and the oil level-lowering warning is released in step S2.

According to the embodiment as described above, in the oil level monitoring system for a motorcycle provided with the ND switching clutch 12 brought by hydraulic pressure into the neutral state where power of the engine is interrupted from the drive wheel side and into the drive state where the power of the engine is applied to the drive wheel side, the oil level sensor 30 detects the oil level of the oil pan 52 storing the operating oil of the ND switching clutch 12. When the oil level lowers to the oil level-lowering warning quantity Lmid, the oil level sensor 30 issues the oil level-lowering warning signal Sf.

The hydraulic sensor 16 detects the hydraulic pressure of the operating oil of the ND switching clutch 12 adapted to receive the operating oil supplied thereto from the oil pan 52. The hydraulic sensor 16 issues the hydraulic pressure-lowering detection signal Sx when the hydraulic pressure lowers to the prescribed hydraulic pressure along with the lowering oil quantity in the oil pan 52.

In this case, the oil level sensor 30 is set such that when the oil level (the oil quantity) of the oil pan 52 lowers, the oil level sensor 30 issues the oil level-lowering warning signal Sf before the hydraulic sensor 30 issues the hydraulic pressure-lowering detection signal Sx.

As described above, according to the embodiment, before the hydraulic sensor 16 issues the hydraulic pressure-lowering detection signal Sx, the oil level sensor 30 issues the oil level-lowering warning signal Sf in a state where a sufficient oil quantity is such so as not to bring the ND switching clutch 12 into the disengagement state is present even if the oil level is inclined (lowers) due to sudden deceleration, sudden start, drive in a slope, or the like. Thus, the ND switching clutch 12 can be prevented from disengaging or engaging (suddenly disengaging or engaging).

In addition, the present invention is not limited to the embodiment described above and can obviously be modified into various configurations on the basis of the description of the present specification.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An oil quantity monitoring system for a motorcycle provided with a hydraulic clutch disengaged/engaged and brought by hydraulic pressure into a neutral state where power of an engine is interrupted from a drive wheel side and into a drive state where the power of the engine is applied to the drive wheel side, comprising:
   an oil level sensor for detecting an oil level of an oil tank for storing operating oil of the hydraulic clutch and issuing an oil level-lowering warning signal when the oil level lowers to a prescribed oil level;
   a hydraulic sensor for detecting hydraulic pressure of the operating oil of the hydraulic clutch adapted to receive the operating oil supplied thereto from the oil tank via a hydraulic circuit; and
   a switching solenoid and a switching spool valve, each being provided in an oil passageway extending between an oil pump and the hydraulic clutch for controlling a flow of the operating oil to the hydraulic clutch;
   wherein the system is set so that when the oil level of the oil tank lowers, the oil level sensor issues the oil level-lowering warning signal before the hydraulic sensor issues a hydraulic pressure-lowering detection signal.

2. The oil quantity monitoring system for the motorcycle according to claim 1, wherein the switching solenoid is an operating oil supply prohibiting device which prohibits supply of the operating oil to the hydraulic clutch upon receipt of the hydraulic pressure-lowering signal from an electronic control unit.

3. The oil quantity monitoring system for the motorcycle according to claim 1, wherein the oil level sensor includes a stem, a float and terminals operatively connected to selectively actuate an oil level-lowering warning-signal generating circuit.

4. The oil quantity monitoring system for the motorcycle according to claim 3, wherein when the operating oil in the oil tank is reduced to lower to a prescribed oil level, a bottom surface of the oil level sensor comes into contact with the terminals for actuating the oil level-lowering warning-signal generating circuit for outputting a warning signal.

5. The oil quantity monitoring system for the motorcycle according to claim 1, wherein the hydraulic clutch is a neutral drive switching clutch, the switching solenoid is a neutral-drive switching solenoid, and the switching spool valve is a neutral drive switching spool valve.

6. The oil quantity monitoring system for the motorcycle according to claim 1, and further including a neutral state detection switch operatively connected a portion of the oil passageway the switching spool valve and the hydraulic clutch for outputting a neutral state detection signal supplied to an electronic control unit.

7. The oil quantity monitoring system for the motorcycle according to claim 1, wherein in the drive state of the hydraulic clutch, the operating oil is supplied to the switching spool valve to actuate the switching spool valve for supplying the operating oil to actuate the hydraulic clutch.

8. The oil quantity monitoring system for the motorcycle according to claim 1, wherein in the neutral state of the hydraulic clutch, the operating oil is not supplied to the switching spool valve and the hydraulic clutch is not actuated.

9. The oil quantity monitoring system for the motorcycle according to claim 1, and further including an electronic control unit for receiving a neutral state detection signal, the hydraulic pressure-lowering detection signal and the oil level-lowering warning signal for monitoring the oil quantity and for selectively issuing a warning indication of low oil quantity.

10. An oil quantity monitoring system comprising:
a hydraulic clutch actuated between a disengaged and an engaged state by hydraulic pressure;
an oil supply;
an oil level sensor for detecting an oil level in the oil supply and for issuing an oil level-lowering warning signal when the oil level lowers to a prescribed oil level;
a hydraulic sensor for detecting hydraulic pressure of the operating oil of the hydraulic clutch adapted to receive the operating oil supplied thereto from the oil supply via a hydraulic circuit; and
a switching solenoid and a switching spool valve, each being provided in an oil passageway extending between an oil pump and the hydraulic clutch for controlling a flow of the operating oil to the hydraulic clutch;
wherein when the oil level of the oil supply lowers below the prescribed oil level, the oil level sensor issues the oil level-lowering warning signal before the hydraulic sensor issues a hydraulic pressure-lowering detection signal.

11. The oil quantity monitoring system for the motorcycle according to claim 10, wherein the switching solenoid is an operating oil supply prohibiting device which prohibits supply of the operating oil to the hydraulic clutch upon receipt of the hydraulic pressure-lowering signal from an electronic control unit.

12. The oil quantity monitoring system for the motorcycle according to claim 10, wherein the oil level sensor includes a stem, a float and terminals operatively connected to selectively actuate an oil level-lowering warning-signal generating circuit.

13. The oil quantity monitoring system for the motorcycle according to claim 3, wherein when the operating oil in the oil tank is reduced to lower to a prescribed oil level, a bottom surface of the oil level sensor comes into contact with the terminals for actuating the oil level-lowering warning-signal generating circuit for outputting a warning signal.

14. The oil quantity monitoring system for the motorcycle according to claim 10, wherein the hydraulic clutch is a neutral drive switching clutch, the switching solenoid is a neutral-drive switching solenoid, and the switching spool valve is a neutral drive switching spool valve.

15. The oil quantity monitoring system for the motorcycle according to claim 10, and further including a neutral state detection switch operatively connected a portion of the oil passageway the switching spool valve and the hydraulic clutch for outputting a neutral state detection signal supplied to an electronic control unit.

16. The oil quantity monitoring system for the motorcycle according to claim 10, wherein in the drive state of the hydraulic clutch, the operating oil is supplied to the switching spool valve to actuate the switching spool valve for supplying the operating oil to actuate the hydraulic clutch.

17. The oil quantity monitoring system for the motorcycle according to claim 10, wherein in the neutral state of the hydraulic clutch, the operating oil is not supplied to the switching spool valve and the hydraulic clutch is not actuated.

18. The oil quantity monitoring system for the motorcycle according to claim 10, and further including an electronic control unit for receiving a neutral state detection signal, the hydraulic pressure-lowering detection signal and the oil level-lowering warning signal for monitoring the oil quantity and for selectively issuing a warning indication of low oil quantity.

* * * * *